(12) United States Patent
Huang et al.

(10) Patent No.: US 7,573,012 B1
(45) Date of Patent: Aug. 11, 2009

(54) PHOTO DRIVER CIRCUIT WITH POWER SAVING FUNCTION AND METHOD THEREOF

(75) Inventors: Chien-Teng Huang, HsinChu (TW); Jeng-Feng Lan, HsinChu (TW); Sheng-Yeh Lai, HsinChu (TW)

(73) Assignee: Chip Goal Electronics Corporation, Hsin-Chu (TW)

( * ) Notice: Subject to any disclaimer, the term of this patent is extended or adjusted under 35 U.S.C. 154(b) by 0 days.

(21) Appl. No.: 12/131,408

(22) Filed: Jun. 2, 2008

(51) Int. Cl.
*G01J 1/32* (2006.01)
(52) U.S. Cl. ................... 250/205; 250/214 R
(58) Field of Classification Search ......... 250/205, 250/214 R, 214 AL, 214 LA; 361/167, 174; 315/149–159, 291–294, 300; 327/514, 516
See application file for complete search history.

(56) References Cited

U.S. PATENT DOCUMENTS 7,312,780 B2 * 12/2007 Olson et al. ................. 345/102

* cited by examiner

*Primary Examiner*—Que T Le
(74) *Attorney, Agent, or Firm*—Tung & Associates

(57) ABSTRACT

The present invention discloses a photo driver circuit with power saving function and a corresponding method thereof. The photo driver circuit with power saving function comprises: a photo sensor device for sensing light and generating a corresponding photo current; a current amplifier amplifying the photo current; an output control circuit for generating a driver output signal according to the output of the current amplifier; and a power saving control circuit for activating a power saving mode in which the power saving control circuit outputs one or more control signals to shut down one or both of the current amplifier and the output control circuit.

25 Claims, 4 Drawing Sheets

PHOTO DRIVER CIRCUIT WITH POWER SAVING FUNCTION AND METHOD THEREOF

BACKGROUND

1. Field of Invention

The present invention relates to a photo driver circuit with power saving function, in particular to such a circuit applied to applications in which power consumption is a concern. The present invention also relates to a photo driving method.

2. Description of Related Art

A photo resistor senses the intensity of ambient light and converts it into an electronic signal. Photo resistors are widely used in applications such as night lamps and automobile headlights whose operation is controlled according to the intensity of ambient light. However, photo resistors are not the most satisfactory choice in such electric products because they contain toxic material (metal sulfide), and their response to light is relatively slow.

On the other hand, CMOS photo sensor devices (including photo diodes, photo transistors and photo ICs) are also capable of sensing the intensity of ambient light, while they are non-toxic.

Regardless whether photo resistors or CMOS photo sensor devices are used, they generate larger current when the intensity of ambient light is high; thus a troublesome problem occurs when such devices are applied to illumination control. Taking the night lamp as an example, when the intensity of ambient light is high and the night lamp does not need to function, the circuit consumes large power due to high current generated in the circuit. In this regard, power-saving function is very much desired, in particular when the product is operated by the power of a battery, or in an application wherein power consumption is a concern.

In view of the foregoing, it is desirous, and thus an objective of the present invention, to provide a photo driver circuit with power saving function which can be applied to e.g., Christmas light strings, bicycle headlight, etc.

SUMMARY

An objective of the present invention is to provide a photo driver circuit with power saving function, to solve the problem in the prior art.

Another objective of the present invention is to provide a photo driving method.

In accordance with the foregoing and other objectives, the present invention provides a photo driver circuit with power saving function which comprises: a photo sensor device for sensing light and generating a corresponding photo current; a current amplifier amplifying the photo current; an output control circuit for generating a driver output signal according to the output of the current amplifier; and a power saving control circuit for activating a power saving mode in which the power saving control circuit outputs one or more control signals to shut down one or both of the current amplifier and the output control circuit.

From another aspect, the present invention provides a photo driving method which comprises the steps of: sensing light and generating a corresponding photo current; generating an amplified current according to the photo current; generating a driver output signal according to the amplified current; and activating a power saving mode in which the generation of the amplified current is stopped when the intensity of the sensed light is larger than a predetermined threshold.

Preferably, in the above photo driver circuit or photo driving method, a signal required for generating the driver output signal is stored in the power saving mode. The signal for example may be a digital signal stored in a digital latch circuit, or an analog signal stored in a sample-and-hold circuit.

Preferably, in the above photo driver circuit or photo driving method, the sensitivity of the driver output signal to the photo current is adjustable.

Preferably, in the above photo driver circuit or photo driving method, the activation point of the power saving mode, i.e., at what condition the power saving mode is activated, is adjustable.

BRIEF DESCRIPTION OF THE DRAWINGS

These and other features, aspects, and advantages of the present invention will become better understood with reference to the following description, appended claims, and accompanying drawings.

DESCRIPTION OF THE PREFERRED EMBODIMENTS

Figure 1:
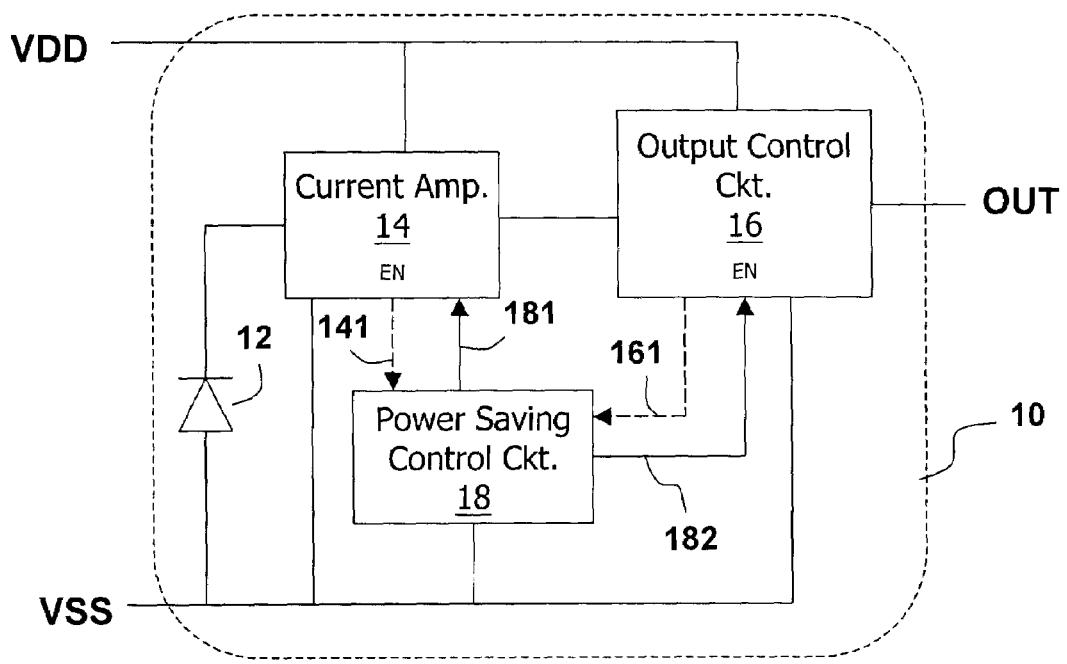
FIG. 1 is a schematic circuit diagram showing a first embodiment of the present invention.

FIG. 1 is a schematic circuit diagram showing a first embodiment of the present invention. As shown in the figure, in this embodiment, the photo driver circuit 10 with power saving function includes a photo sensor device 12 (shown as a photo diode in the figure, but can be any other photo sensor device such as a photo transistor or a photo IC), a current amplifier 14, an output control circuit 16, and a power saving control circuit 18. The photo sensor device 12 senses light and generates photo current; the current amplifier 14 amplifies this photo current and transmits it to the output control circuit 16. In one embodiment, the output control circuit 16 generates an output driver signal OUT according to the output from the current amplifier 14; this output driver signal OUT for example may be used to drive a next-stage circuit (not shown) for automatic illumination control. Alternatively, the signal OUT may be other types of signals, such as a multi-bit data signal.

One feature of the present invention is the power saving control circuit 18 provided in the photo driver circuit 10. The power saving control circuit 18 issues control signals 181 and/or 182 to enable or disable the current amplifier 14 and/or the output control circuit 16; when one or both of the current amplifier 14 and the output control circuit 16 are disabled, the photo driver circuit 10 enters the "power saving mode". To "disable" the current amplifier 14 or the output control circuit 16 means to stop the operation of part of the amplifier circuit or the control circuit for power saving purpose; it does not mean that the whole amplifier circuit or the whole control circuit is shut down. For example, the current amplifier 14 may include multiple stages of amplifier circuits, and in this case to "disable" the current amplifier 14 can be to shut down the stages of amplifier circuits which are relatively more power-consuming, but still keep at least one stage of amplifier circuit for sensing the ambient light.

More specifically, supposing the circuit shown in the figure is for illumination control, and its next stage is an illumination device (such as an LED), in the case where the power saving control circuit 18 is not provided, when the intensity of ambient light is high, the photo sensor device 12 generates large current, and the current amplifier 14 amplifies this current even larger. Thus, the output control circuit 16 generates a low-level output driver signal OUT according to the output from the current amplifier 14. On the other hand, when the intensity of ambient light is low, the photo sensor device 12 generates low or no current, and the output control circuit 16 generates a high-level output driver signal OUT according to the output from the current amplifier 14, to activate the illumination. The output driver signal OUT can be an analog signal or a digital signal, depending on the design of the next stage circuit.

In the operation described above, when the intensity of ambient light is high and no illumination is required, the current amplifier 14 and the output control circuit 16 consume considerably large current, and therefore should be improved.

According to the present invention, a power saving control circuit 18 is provided which can disable the current amplifier 14 and/or the output control circuit 16 as required when a preset condition is met, to enter the power saving mode. The "preset condition" is also referred to as the "activation point" of the power saving mode, which for example may be a preset threshold of the intensity of light sensed by the photo sensor device 12. There are various ways to embody the power saving control circuit 18 so that it can determine whether a preset condition is met; in one embodiment, the determination can be based on the signal 141 (which is a current signal, for example) generated by the current amplifier 14 and/or the signal 161 (which is a voltage signal, for example) generated by the output control circuit 16. When the signal 141 meets a preset current condition, or when the signal 161 meets a preset voltage condition, or both, the power saving control circuit 18 issues a control signal, so that the photo driver circuit 10 enters the power saving mode.

Figure 2:
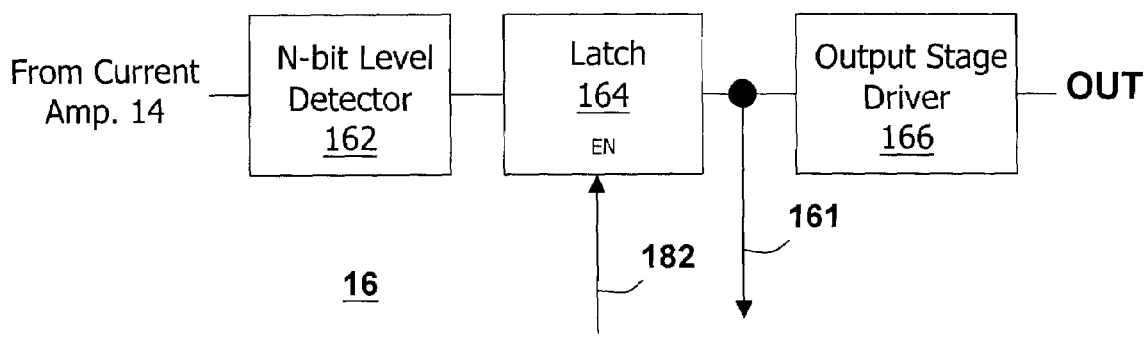
FIG. 2 shows a preferred embodiment of the output control circuit 16.

When the photo driver circuit 10 enters the power saving mode, it can be arranged so that no current flows in the output control circuit 16, and therefore the output driver signal OUT is naturally at low level, to turn off the illumination. However in some applications, the output driver signal OUT may need to be at high level when the photo driver circuit 10 enters the power saving mode; in this case, a latch circuit may be provided in the output control circuit 16, to ensure that the circuit at the next stage receives a correct output driver signal in the power saving mode. FIG. 2 shows an example of such output control circuit 16. As shown in the figure, the output control circuit 16 in this embodiment includes an N-bit level detector 162 (wherein N is an integer), a latch circuit 164 and an output stage driver circuit 166. The N-bit level detector 162 receives the analog output signal from the current amplifier 14 and converts it into an N-bit digital signal; the converted digital signal is stored in the latch circuit 164. The N-bit level detector 162 may simply be a comparator if N=1. The latch circuit 164 includes an enable switch EN; the content in the latch circuit 164 can be changed only when the switch EN is enabled by the control signal 181, otherwise the content is latched. The output stage driver circuit 166 generates the output driver signal OUT according to the content in the latch circuit 164. Thus, in the power saving mode, because the current amplifier 14 stops functioning and the output therefrom is no longer valid, the N-bit level detector 162 can be shut down, while the content in the latch circuit 164 is still correct and is capable of providing a correct output driver signal to the circuit at the next stage to the photo driver circuit 10.

As stated above, in one embodiment, the power saving control circuit 18 determines whether to enter the power saving mode according to the voltage signal 161 from the output control circuit 16. As an example, the signal 161 may be generated from the location as shown in the figure, i.e., the output node of the latch circuit 164. In this arrangement, the signal 161 is digital and may facilitate the judgment to be made by the power saving control circuit 18. However, depending on the circuit design of the output control circuit 16 and the power saving control circuit 18, the signal 161 is not limited to be a digital signal, and is not limited to be taken from the location shown in the figure. If the signal 161 is analog, it can be compared with a preset reference voltage to achieve the same function required.

Figure 3:
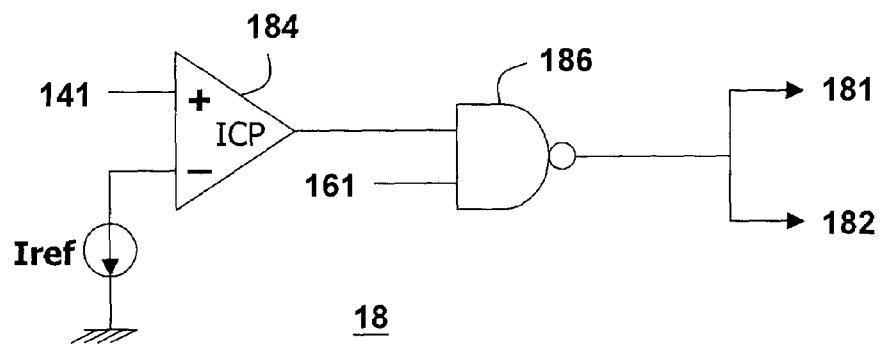
FIG. 3 shows a preferred embodiment of the power saving control circuit 18.

FIG. 3 shows an embodiment of the power saving control circuit 18. In this embodiment, the signal 141 is an analog current signal which for example may be taken from the current amplifier 14 as shown in FIG. 1, or directly from the output of the photo sensor device 12. The signal 161 is a single-bit digital signal which for example may be taken from the location as shown in FIG. 2. If the latch circuit 164 in FIG. 2 outputs a multi-bit signal, the single-bit digital signal 161 may be one of the digits of the multi-bit signal, or a logic operation may be performed on the digits to generate the signal 161. As shown in the figure, a current comparator ICP 184 compares the signal 141 with a predetermined reference current Iref. When the signal 141 is larger than the predetermined reference current Iref, it means that the intensity of the ambient light is higher than a predetermined brightness threshold, and the comparator 184 outputs a high level signal. And, when the signal 161 is high, it means that the output from the N-bit level detector 162 is equal to or higher than a predetermined voltage threshold (for example, in the case N=1, the output from the N-bit level detector 162 is a high level signal "1"). When both inputs of a logic circuit 186 is high, it outputs low level control signals 181 and 182, to disable the current amplifier 14 and the output control circuit 16. When one of the inputs of a logic circuit 186 is low, it outputs high level control signals 181 and 182, to enable the current amplifier 14 and the output control circuit 16.

The power saving control circuit 18 in the above embodiment determines whether to enter the power saving mode according to both the signals 141 and 161, and sends out both control signals 181 and 182 to concurrently enable or disable the current amplifier 14 and the output control circuit 16. In another embodiment, the determination can be based on either one of the signals 141 and 161. In yet another embodiment, only one of the control signals 181 and 182 is issued. Furthermore, it can be arranged so that the control signals 181 and 182 are independently issued according to different determination basis. The embodiment to base the determination on both signals 141 and 161 provides the benefit that it filters out noises in the signal 141 due to fluctuation in the intensity of the ambient light, so that the photo driver circuit 10 will not keep switching between the power saving mode and the normal operation mode.

Figure 4:
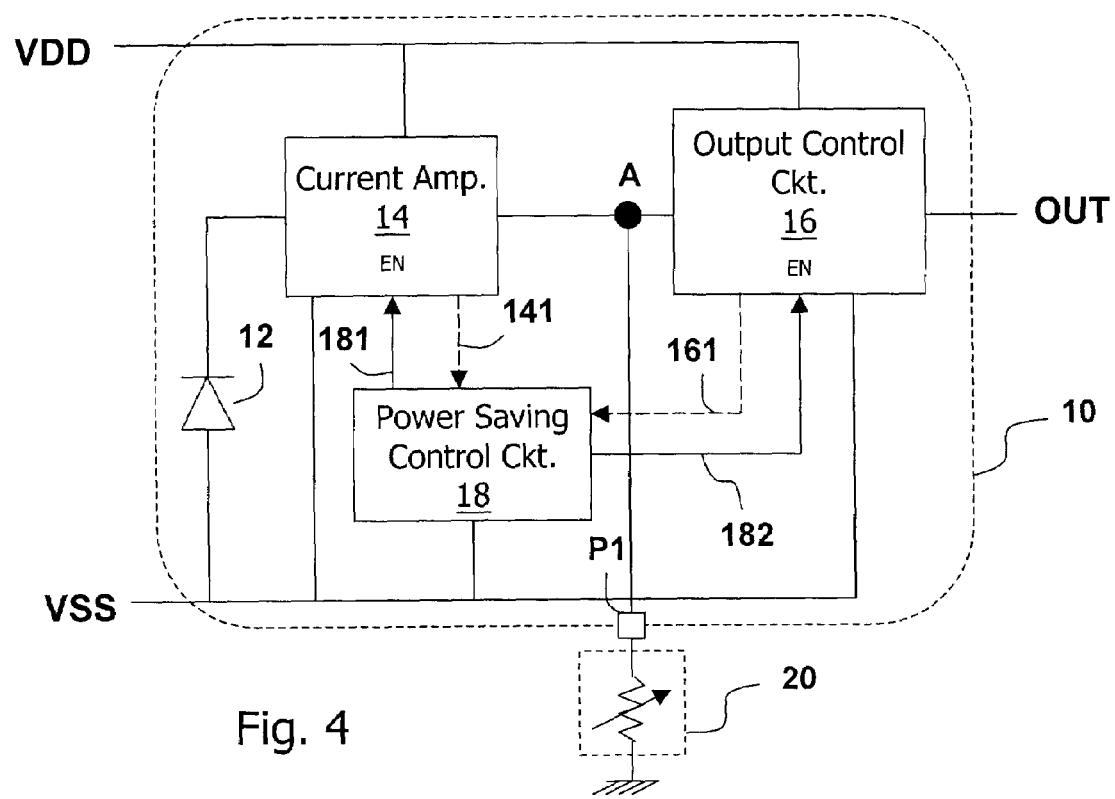
FIG. 4 is a schematic circuit diagram showing another embodiment of the present invention.

FIG. 4 shows another embodiment according to the present invention, wherein an adjustment circuit 20 is provided to adjust the level of the output signal from the current amplifier 14. The purpose to provide the adjustment circuit 20 is to adjust the ratio of the input signal level of the output control circuit 16 to the current generated by the photo sensor device 12, so that the sensitivity of the photo driver circuit 10 to the intensity of ambient light (or, the sensitivity of the output driver signal OUT to the intensity of ambient light) can be adjustable. In this embodiment, the adjustment circuit 20 is a variable resistor connected externally to the photo driver circuit 10 via a pin P1, so that a user may adjust the sensitivity. The adjustment circuit 20 may be embodied in various other ways in various other locations, such as adjusting the amplification rate of the current amplifier 14. In this embodiment, because the output from the current amplifier 14 is a current signal, the voltage at the node A can be adjusted by adjusting the resistance of the variable resistor 20. Thus, the ratio of the input signal level of the output control circuit 16 to the current generated by the photo sensor device 12 is correspondingly adjusted. Of course, depending on whether the input signal of the output control circuit 16 is a current signal or a voltage signal, the internal circuitry of the output control circuit 16 should be correspondingly designed.

Figure 5:
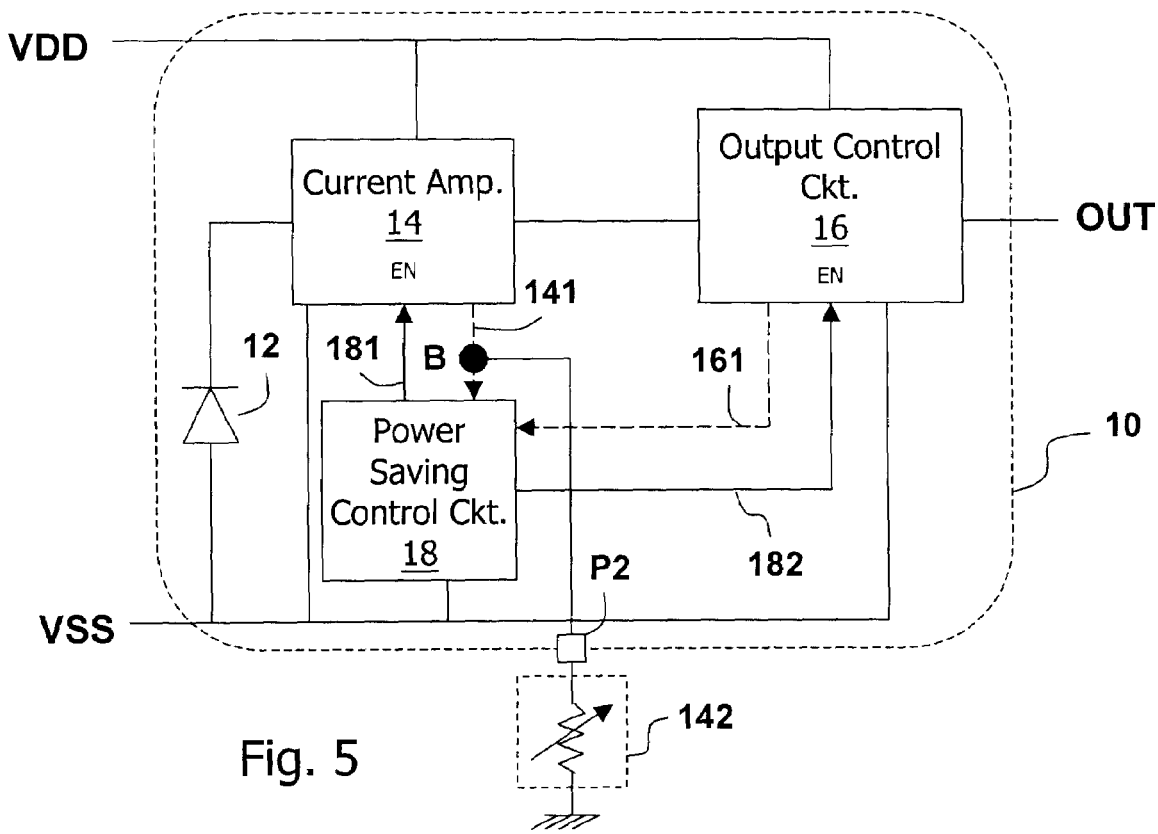
FIG. 5 is a schematic circuit diagram showing yet another embodiment of the present invention.
Figure 6:
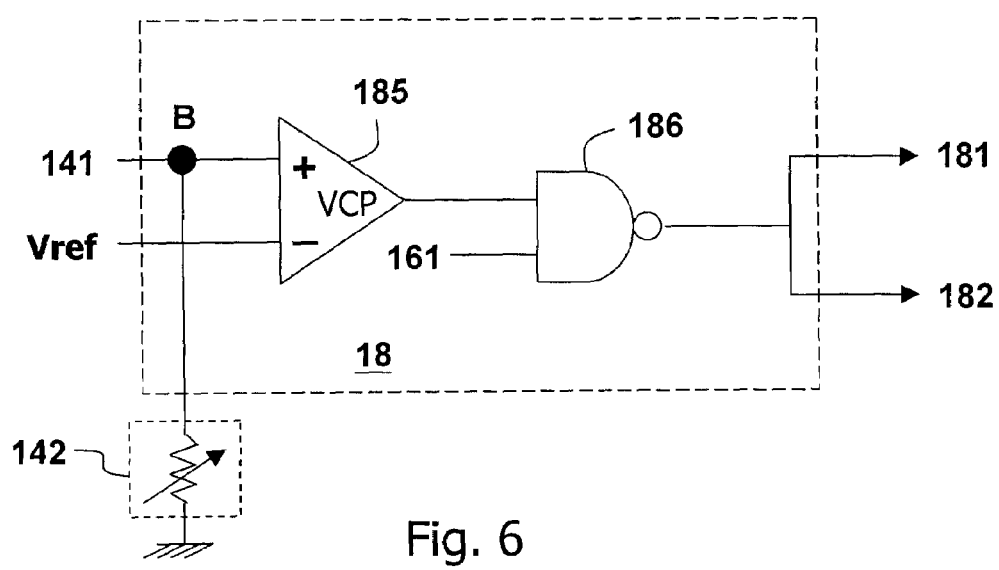
FIG. 6 shows another preferred embodiment of the power saving control circuit 18 which may be used in the embodiment of FIG. 5.
Figure 7:
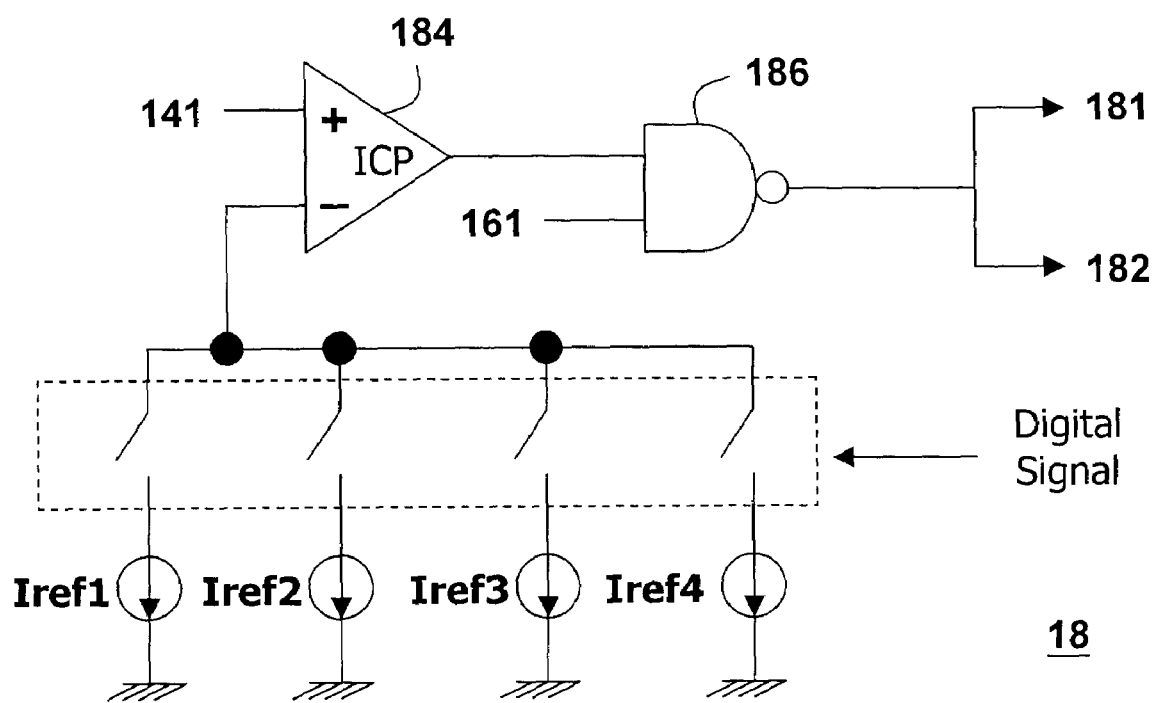
FIG. 7 shows another preferred embodiment of the power saving control circuit 18 which may be adjusted in digital manner.

Moreover, as shown in FIG. 5, the magnitude of the signal 141 received by the power saving control circuit 18 also can be adjusted to adjust the activation point of the power saving mode. In the embodiment of FIG. 5, an adjustment circuit 142 is provided, which is a variable resistor connected externally to the photo driver circuit 10 via a pin P2, so that a user may adjust the magnitude. In accordance thereto, the internal circuitry of the power saving control circuit 18 may be as shown in FIG. 6, in which the current signal 141 is converted to a voltage signal at node B by the adjustment circuit 142. A voltage comparator VCP 185 compares the voltage at the node B with a predetermined reference voltage Vref, to decide the level of one input to the logic circuit 186. As such, the adjustment circuit 142 provides a weighting; the photo current generated by the photo sensor device 12 is timed by this weighting, and then compared with a reference value. The above shows an example to adjust the activation point of the power saving mode; note that the activation point of the power saving mode can be adjusted in various other ways. For example, it can be adjusted by adjusting the reference current Iref in FIG. 3. Furthermore, the adjustment can be made in a digital manner instead of the aforementioned analogous manner, as shown in FIG. 7.

The present invention can be applied to products which receive power from a battery, or to applications wherein power consumption is a concern, such as Christmas light strings, bicycle headlights, etc.

The spirit of the present invention has been explained in the foregoing with reference to its preferred embodiments, but it should be noted that the above is only for illustrative purpose, to help those skilled in this art to understand the present invention, and not for limiting the scope of the present invention. Within the same spirit, various modifications and variations can be made by those skilled in this art. For example, the function of "high" and "low" of the signals in the embodiments can be arranged otherwise; the positive and negative inputs of the comparators ICP 184 or VCP 185 can be interchanged, with the logic circuit 186 correspondingly modified. As another example, in the output control circuit 16, the latch circuit can be replaced by a sample-and-hold circuit, to store a signal in an analogous manner. In view of the foregoing, it is intended that the present invention cover all such modifications and variations, which should interpreted to fall within the scope of the following claims and their equivalents.

What is claimed is:

1. A photo driver circuit with power saving function comprising:
   a photo sensor device for sensing light and generating a corresponding photo current;
   a current amplifier amplifying the photo current;
   an output control circuit for generating a driver output signal according to the output of the current amplifier; and
   a power saving control circuit for activating a power saving mode in which the power saving control circuit outputs one or more control signals to shut down one or both of the current amplifier and the output control circuit.

2. The photo driver circuit of claim 1, wherein the photo sensor device is a photo diode, a photo transistor, or a photo IC.

3. The photo driver circuit of claim 1, wherein the output control circuit generates a data signal according to the output from the current amplifier, and generates the driver output signal according to the data signal, and wherein the output control circuit includes a latch circuit to store the data signal in the power saving mode.

4. The photo driver circuit of claim 1, wherein the output control circuit includes:
   an N-bit level detector converting the output from the current amplifier into an N-bit digital signal, wherein N is a positive integer;
   a latch circuit storing the N-bit digital signal from the N-bit level detector; and
   an output stage driver generating the driver output signal according to the content in the latch circuit.

5. The photo driver circuit of claim 4, wherein the N-bit level detector is a comparator.

6. The photo driver circuit of claim 4, wherein the latch circuit includes an enable switch, which receives the one control signal from the power saving control circuit.

7. The photo driver circuit of claim 1, wherein the power saving control circuit generates the one or more control signals according to one or both of the following signals: (1) a first indicator signal generated by the current amplifier; (2) a second indicator signal generated by the output control circuit.

8. The photo driver circuit of claim 7, wherein the first indicator signal generated by the current amplifier is a current signal, and the second indicator signal generated by the output control circuit is a voltage signal.

9. The photo driver circuit of claim 7, wherein the second indicator signal generated by the output control circuit is a digital signal.

10. The photo driver circuit of claim 7, wherein the output control circuit includes a latch circuit to store the data signal in the power saving mode, and the second indicator signal is generated by the output control circuit according to the output from the latch circuit.

11. The photo driver circuit of claim 1, wherein the ratio between the level of an input signal to the output control circuit and the photo current generated by the photo sensor device is adjustable.

12. The photo driver circuit of claim 11, further comprising a pin for electrically connecting with an external adjusting circuit to adjust the ratio.

13. The photo driver circuit of claim 12, wherein the external adjusting circuit includes a resistor for adjusting the voltage at an input node to the output control circuit.

14. The photo driver circuit of claim 7, wherein the activation point for the power saving control circuit to activate the power saving mode is adjustable.

15. The photo driver circuit of claim 14, further comprising a pin for electrically connecting with an external adjusting circuit to adjust the activation point.

16. The photo driver circuit of claim 15, wherein the first indicator signal generated by the current amplifier is a current signal, and the external adjusting circuit includes a resistor for converting the current signal to a voltage value.

17. The photo driver circuit of claim 15, wherein the power saving control circuit compares the first indicator signal generated by the current amplifier with a reference value, and the external adjusting circuit generates a digital signal to adjust the reference value.

18. A photo driving method comprising:
sensing light and generating a corresponding photo current;
generating an amplified current according to the photo current;
generating a driver output signal according to the amplified current; and
activating a power saving mode in which the generation of the amplified current is stopped when the intensity of the sensed light is larger than a predetermined threshold.

19. The photo driving method of claim 18, wherein the light is sensed by a photo diode, a photo transistor, or a photo IC.

20. The photo driving method of claim 18, wherein the step of generating a driver output signal according to the amplified current includes: generating a data signal corresponding to the amplified current, and storing the data signal in the power saving mode.

21. The photo driving method of claim 20, wherein it is determined that the sensed light is larger than a predetermined threshold when one or both of the following conditions are met: (1) the photo current is larger than a preset reference value; (2) the data signal generated corresponding to the amplified current meets a preset requirement.

22. The photo driving method of claim 18, further comprising: adjusting the sensitivity of the driver output signal to the photo current.

23. The photo driving method of claim 18, further comprising: adjusting an activation point of the power saving mode.

24. The photo driving method of claim 21, wherein the photo current is timed by a weighting which is adjustable, and compared with the reference value.

25. The photo driving method of claim 21, further comprising: adjusting the reference value.

\* \* \* \* \*